Dec. 10, 1940.  W. O. EILERT  2,224,126
CONVERTIBLE RACK FOR TRUCKS OR THE LIKE
Filed Aug. 24, 1939  4 Sheets-Sheet 1
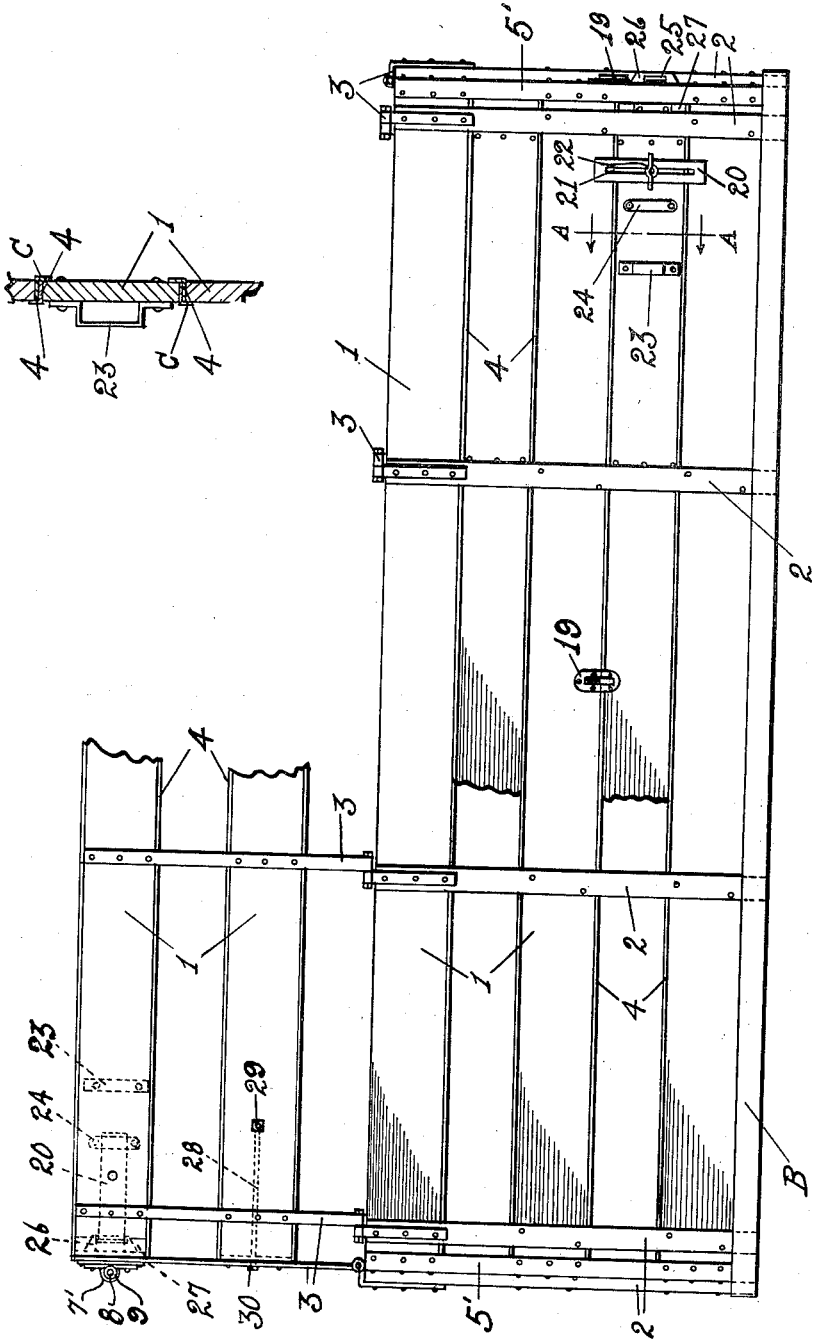
INVENTOR.
WALTER O. EILERT
BY U. Y. Charles
ATTORNEY.

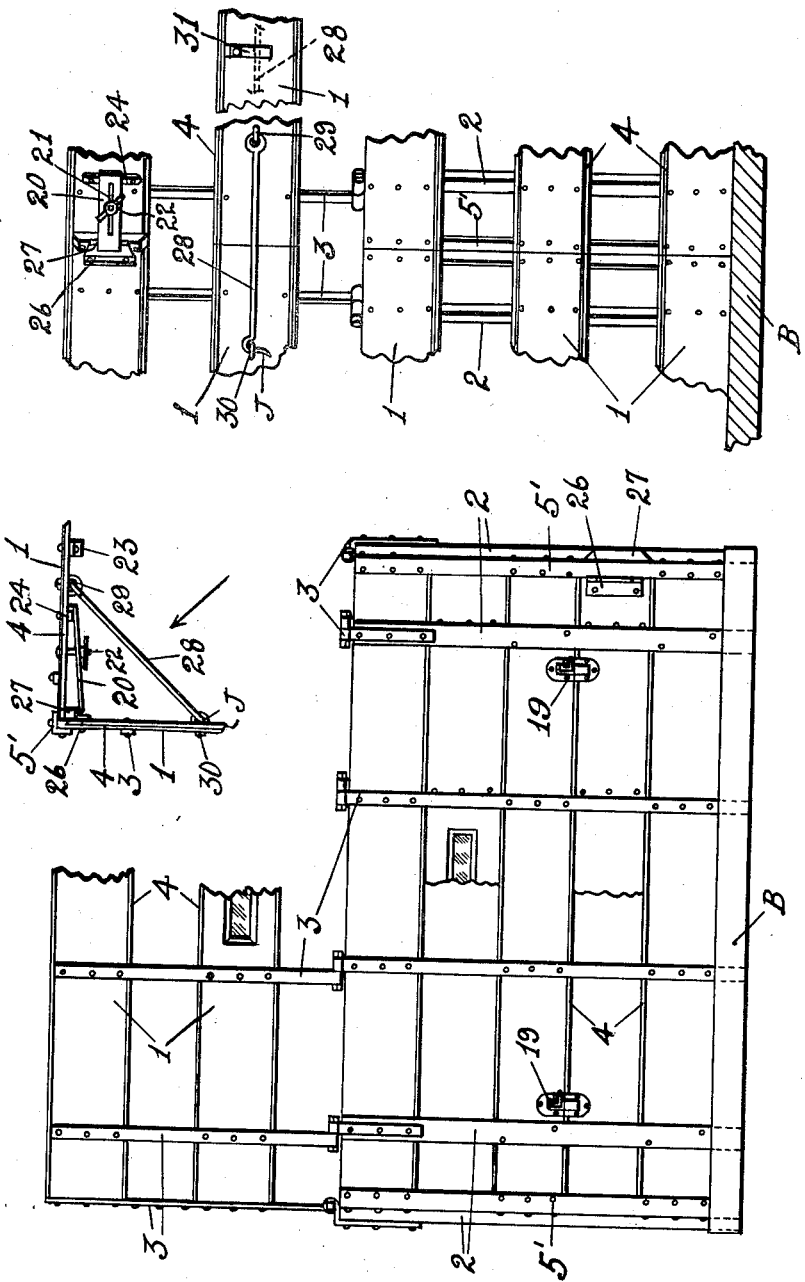

Dec. 10, 1940.     W. O. EILERT     2,224,126
CONVERTIBLE RACK FOR TRUCKS OR THE LIKE
Filed Aug. 24, 1939     4 Sheets-Sheet 3
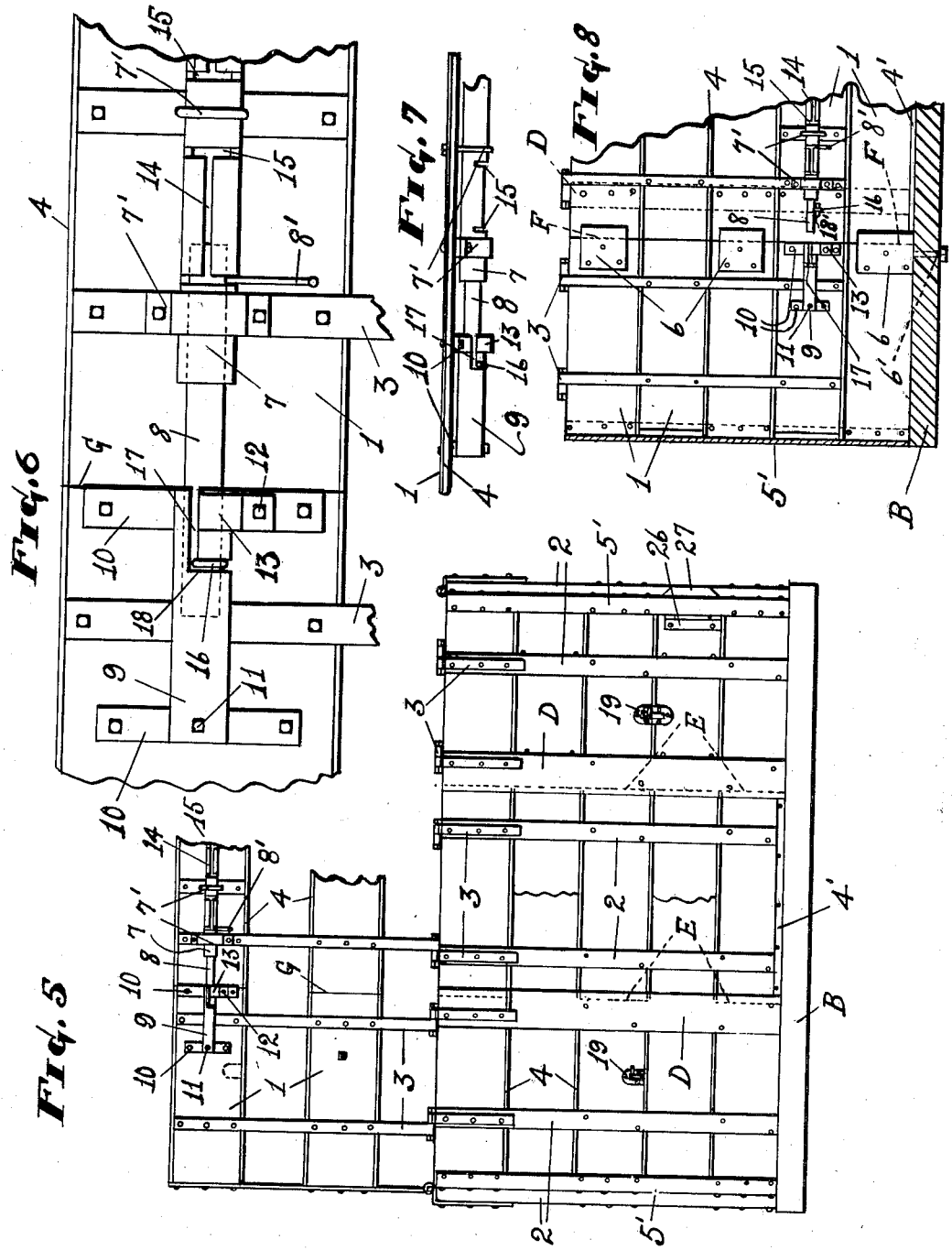
INVENTOR.
WALTER O. EILERT
BY
ATTORNEY.

Dec. 10, 1940.  W. O. EILERT  2,224,126
CONVERTIBLE RACK FOR TRUCKS OR THE LIKE
Filed Aug. 24, 1939  4 Sheets-Sheet 4
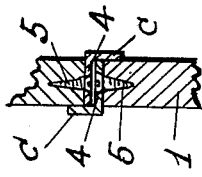
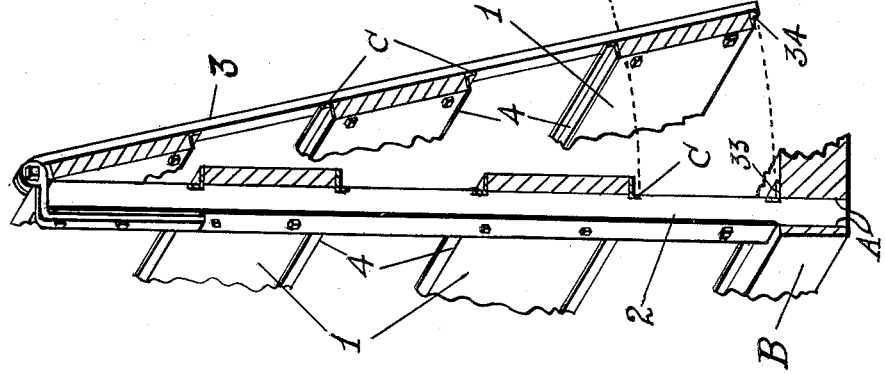
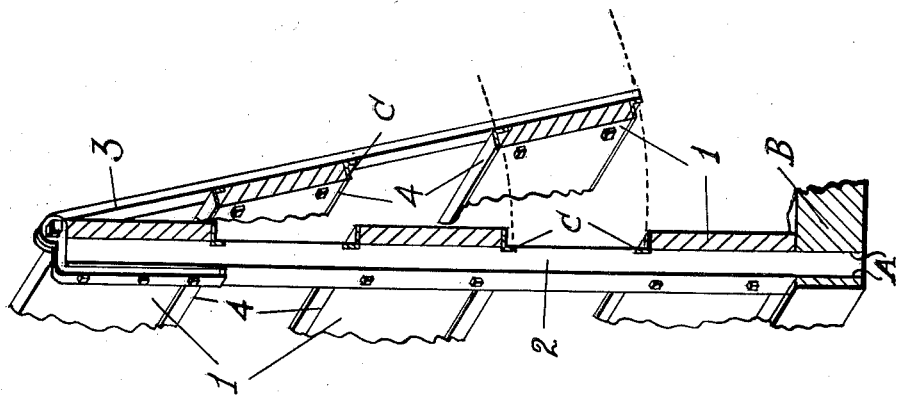
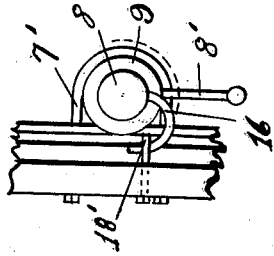
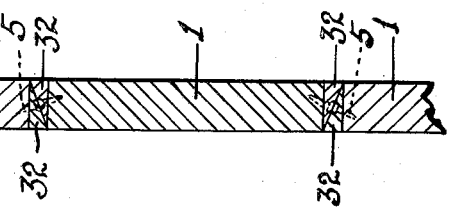
INVENTOR.
WALTER O. EILERT
BY U. Y. Charles
ATTORNEY.

Patented Dec. 10, 1940

2,224,126

UNITED STATES PATENT OFFICE 2,224,126

CONVERTIBLE RACK FOR TRUCKS OR THE LIKE

Walter O. Eilert, Furly, Kans.

Application August 24, 1939, Serial No. 291,692

1 Claim. (Cl. 296—13)

My invention relates to improvements in a convertible rack for trucks or the like and has for its principal object a means to secure the bars grain tight, said means to reinforce the bars when the structure is converted into a rack for livestock transportation.

A further object of my invention is to provide a simple and efficient means to secure the rack intact, regardless the adaptation.

A still further object of my invention is to construct a rack having a plurality of wood bars spaced apart for a stationary portion and another portion comprising a plurality of bars spaced apart, said portion rockably carried by the stationary portion, whereby the bars of each portion will interposition to close the spaces, the joints between said bars having metal linings.

A still further object of my invention is to provide in the construction of a convertible rack having metal corners and other stabilizing means to secure the rack operatively as a grain or livestock container.

These and other objects will hereinafter be more fully explained, reference being had to the accompanying drawings forming a part of this specification, in which like characters will apply to like parts in the different views.

Referring to the drawings:

Fig. 1 is a side elevation of the rack as broken to illustrate its adaptation to grain or livestock transportation.

Fig. 1A is a sectional view taken on line A—A in Fig. 1, looking in the direction of the arrows.

Fig. 2 is an end elevation broken to illustrate its adaptation to grain or livestock transportation.

Fig. 3 is a plan view of one of the rear corners, side and end broken away.

Fig. 4 is a corner elevation as adapted to livestock, looking in the direction of the arrow in Fig. 3.

Fig. 5 is a rear end elevation of the rack, illustrating its adaptability, and showing the end gate.

Fig. 6 is an enlarged elevation to illustrate the lock carried by the upper bar in Fig. 5, partly broken away.

Fig. 7 is a reduced plan view of Fig. 6.

Fig. 8 is an inside elevation of the rear end as collapsed and locked for grain transportation.

Fig. 9 is an enlarged end view of the lock bolt as attached to the endgate.

Fig. 10 is an enlarged sectional view to illustrate the collapsibility.

Fig. 11 is an enlarged sectional view through the joint of the horizontal bars.

Fig. 12 is a similar view to Fig. 10 modified to eliminate the stationary box carried by the floor of the rack.

Figs. 13 and 14 are sectional views illustrating the joint assembly as modified.

My invention herein disclosed relates to a convertible rack consisting of stationary lower and rockable upper portions, the ends and sides of said rack comprised of a plurality of bars 1 (preferably of wood) horizontally positioned and spaced apart equal to or slightly greater in width to that of the bars for interposition purpose, so that the upper portion when rocked downward to engagement with the lower portion, the bars of each will enter their respective spaces whereby a vertically straight aligned wall is formed by the said bars, and retained in such position by fastenings, later described, as a grain tight feature.

The bars of the said lower stationary portions are each secured rigid to their respective plurality of standards 2 spaced therealong, the lower ends of which extend through their respective mortices A through the floor board B as shown in Figs. 10 and 12. Each standard at its upper end has one leaf of a hinge 3 connected thereto, the other leaf extending across the bars of the said rockable portion and being the carrying means for their respemtive bars as spaced apart, by which means, said upper portions may rock inward and downward to form a grain tight box, and when rocked upward is means to form a livestock rack.

The confronting edge of each bar has a metallic L-shaped element 4 with respect to cross section, said elements adapted to interlap as a grain tight feature as shown in the drawings and more particular as illustrated in Fig. 11, and said elements being of equal length to that of their respective bars and being secured by screws 5 spaced therealong. The edges of the said wood bars being thus equipped is also means to provide ample room between the bar edges to avoid binding tendency that might occur by excess shrinkage of said wood bars transversely, whereby the lap of the metallic bar legs as at C will continue to seal the open joint.

Vertically positioned at each corner of the rack is a metallic angle bar 5' to which the stationary bars of the rack are secured, while the ends of the rockable upper portions will lap thereon when rocked downward as a grain container substantially as shown in Fig. 8.

The rear end wall of the rack is divided into three vertically disposed sections, the center section of which is arranged to slide vertically and, removable from the side sections, the center or endgate being retained and guided by standards D that are secured to the stationary bars of the side sections and extending outward from the ends thereof as shown by dotted lines E in Fig. 5, the inside guides consisting of plates 6, each being secured to their respective side section bars as shown in Fig. 8, the bottom plate being secured to the floor by bolt 6' to avoid rocking upward and outward movement of the sections, said plates outwardly extending to engage over the ends of the endgate bars as shown by dotted lines F in Fig. 8, by which arrangement the upper section of the endgate is free to rock into the spaces between the bars of the lower section when said endgate is normally closed. To avoid mutilation of the endgate there is placed on the lower edge of the endgate bar an angleiron 4' under which a pinch bar may be inserted as starting means to open the gate. It will be understood that the bars of the upper portion are severed in vertical alignment with the side edges of the gate as indicated by line G, whereby the tie for the rear portion of each side of the rack is severed, and to secure the said sides rigidly when the rack is positioned for livestock, I have provided a lock comprised of a sleeve 7 secured to the upper bar of the gate by appropriate clamps 7' substantially as shown, there being a bolt 8 telescopically engaging in each end of the sleeve, similar in design and function, one end of which is omitted from the drawing. Each bolt is moved longitudinally by an arm 8' secured to the bolt by which means said bolt is moved to and from engagement with a sleeve element 9, the latter being secured to its respective top bar of the side section of the rearend wall, the ends of said sleeve being seated on spacing blocks 10 and being secured thereto by a bolt 11 at its outer end, and a bolt 12 engaging through an ear of a clamp 13 having an arcuate portion to partially incumber the other end of the sleeve as shown in Fig. 6.

To operate the lock the sleeve 7 has a slot 14 through its side longitudinally, along which the arm will slidably engage, and the said slot has a transversely positioned slot 15 at each end thereof and extending each way therefrom to receive the said arm in either rocked position of the upper portion of the endgate, whereby the arm will extend downward, locking the bolt in either upward or downward position of said upper portion of the endgate, and to tie the upper portions of the end sections from spreading it will be seen that the lock bolt 8 has an arcuate hook 16 transversely extending and secured to the outer end of the bolt to slidably engage through a slot 17 entering at the end of said sleeve 9 and terminating a spaced distance inward at a transversely positioned slot 18 communicating therewith, and by rocking said hook to engage in the latter named slot will lock the side sections firmly to the endgate, there being one lock for each of said side sections, similar to that shown in Fig. 5; furthermore, when the upper section of the end gate is rocked downward the said hook 16 may be rocked to engagement with an eye 18' that is secured to its respective guide bar D near the lower end thereof by throwing the arm in the opposite direction as shown in Figs. 8 and 9.

The end bars of the rack when rocked to their interposition as a grain container are secured to snug engagement by a sliding bolt lock 19 positioned a spaced distance inward from each end of the bars, the bolt portion of the lock being secured near the lower edge of one of the bars of the stationary portion, while the receiving eye of the lock is carried by a bar of the upper or rockable portion of the rack; and a similar lock is centrally applied to each side of the rack as shown in Fig. 1.

As a means to lock each end of the side bars to snug engagement with their respective angle bar corners there is positioned preferably on the lower bar of the rockable portion when the rack is collapsed a metallic bar 20 having a slot 21 longitudinally along its center, through which the bolt of a wing nut 22 will extend as securing means for the metallic bar transversely crossing the joint so that the ends thereof will engage on the adjacent upper and lower stationary wood bars, and the said slotted bar when disengaged will be turned transversely to its locking position and moved longitudinally to enter a support 23 formed to receive one end of said bar as retaining means for said bar while rocking its respective rack portion upward. When so positioned, said bar will function as a tie for snug engagement of its respective end of its respective side bar to a corresponding end bar of the rack as follows: each end of said slotted bar has a right angle bend in the same direction whereby lips are formed, one of which will engage on the edge of a plate 24 that is secured to the rack bar while the other end will enter a slot 25 positioned in one leg of an angle member 26 that is secured to an end bar of the rack in its working relation as shown in the drawings and more particularly in Figs. 3 and 4, and the bar is retained against longitudinal movement by tightening the said wing nut when the corners of the rack are equal and snugly engaged and to avoid inward movement of the end bar along the side bar I have secured a block 27 to the side bar functioning as a stop and against which the end bar will engage as retained by the said slotted and lipped bar. It will be understood that each of the four corners of the rack are secured in like manner when the rack is adapted to livestock transportation.

To retain the upper portions of the rack at right angles when arranged for livestock transportation, I have connected corresponding ends of the second bars from the top with a brace rod 28 having one end connected to an eye bolt 29 engaging in an eye formed at the end of the rod while the other end has a hook J to engage in the eye of a bolt 30 that is secured to the other bar, and when said rods are disengaged they are rocked back on their respective bars and retained by leaf springs 31 by their engagement thereunder, as shown in Fig. 4, by which means the rod is retained unobstructive when the upper portions of the rack is collapsed to engagement as a grain retainer.

In Figs. 12 and 13 is shown certain modifications for the rack structure one of which as in Fig. 13 consists of convergent edges for the bars of the upper portion to wedge with a close fit between bars of the lower portion, coinciding therewith, the edges of all of said bars having a metallic strip 32 extending therealong and being secured to their respective bar edges will provide a metal lining for the joint to avoid fibrous friction when the bars are forced to grain tight engagement. The other modification is disclosed in Fig. 12 whereby the box-like and end walls are eliminated and substituted by an angle bar 33 secured to the floor and adapted to receive a like bar 34 that is secured to the lower edge of a wood bar that closes the space between the floor of the rack and the bar thereabove when the rack is collapsed as a grain container; furthermore being so arranged, is means to ventilate at the floor level and to discharge accumulation as a result of livestock being transported, and such other modifications may be made as lie within the scope of the appended claim.

Having fully described my invention what I claim as new and desire to secure by Letters Patent is:

In a convertible rack for trucks or the like, of the class described, in combination with a vehicle having a floor carried thereby, the combination of a vertically disposed wall comprised of upper and lower sections hingedly connected for upper rocking movement of the upper section, each section comprised of a plurality of wood bars spaced apart in such a way as to interposition when the upper section is rocked downward to engagement with the lower section whereby a solid wall is formed, of a metallic angle iron for each corner of the rack, vertically disposed and loosely seating on the floor structure, and to which their respective end of the lower section of the wood bars are rigidly secured, of a plurality of wood standards spaced apart intermedially of the corners, said bars vertically disposed and being secured to the floor structure and to which the bars of the said lower section are rigidly secured, the hinge connection of the upper and lower sections comprised of short and long wing portions, the short wings being secured to the top of their respective standards while the long wings function as cleats and to which the woods bars of the upper section are rigidly secured in spaced relation for interpositioning with the lower section bars when rocked to engagement therewith and each end portion of the upper section bars to seat removable on their respective corner angle bars, a convertible bar lock secured to the outer wood bar of the upper section, said lock bar slidably and rockably connected to said wood bar to function as a locking means for interpositioned engagement of the upper and lower sections by turning the locking bar to overlap the adjacent upper and lower bars of the lower section whereby the rack as a grain transport is firmly secured, and also as a locking means for the corners of the upper side and end sections when the rack is converted into a livestock transport.

WALTER O. EILERT.